United States Patent
Abdulaev (10) Patent No.: US 7,976,064 B2
(45) Date of Patent: Jul. 12, 2011

(54) DEVICE FOR FACILITATING THE MOVEMENT OF A VEHICLE

(76) Inventor: Yaragi Abdulaev, London (GB)

( * ) Notice: Subject to any disclaimer, the term of this patent is extended or adjusted under 35 U.S.C. 154(b) by 584 days.

(21) Appl. No.: 11/569,738

(22) PCT Filed: Jun. 3, 2005

(86) PCT No.: PCT/GB2005/002203
§ 371 (c)(1), (2), (4) Date: Nov. 28, 2006

(87) PCT Pub. No.: WO2005/118378
PCT Pub. Date: Dec. 15, 2005

(65) Prior Publication Data
US 2008/0042490 A1    Feb. 21, 2008

(30) Foreign Application Priority Data
Jun. 4, 2004  (GB) .................................. 0412523.3

(51) Int. Cl.
*B62D 55/02* (2006.01)
(52) U.S. Cl. ......... 280/755; 180/190; 180/191; 180/9.1; 180/9.28; 180/9.3
(58) Field of Classification Search .................. 280/755, 280/7.12, 8, 9, 10, 11; 180/9, 9.1, 9.21, 9.28, 180/9.3, 184, 185, 190, 191, 192, 193, 194, 180/1, 95, 196; 305/120, 121, 122, 52
See application file for complete search history.

(56) References Cited

U.S. PATENT DOCUMENTS

| 401,367 | A | * | 4/1889 | Peirce | 305/121 |
| 1,139,009 | A | * | 5/1915 | Allen | 305/52 |

(Continued)

FOREIGN PATENT DOCUMENTS

DE    2 753 706 A1    6/1979

(Continued)

OTHER PUBLICATIONS

Examination Report of the UK Intellectual Property Office for GB 0412523.3, issued Aug. 7, 2007.

(Continued)

*Primary Examiner* — Hau V Phan
*Assistant Examiner* — Bryan A Evans
(74) *Attorney, Agent, or Firm* — Craig A. Fieschko, Esq.; DeWitt Ross & Stevens S.C.

(57) ABSTRACT

A device for facilitating the movement of a vehicle across ground comprises a track able to move around a board. The device includes a track for contacting ground that is mounted on a board. Brackets are provided for attaching the board to a vehicle. The track is movable in a direction independent of the direction of movement of the vehicle in at least the reverse direction relative to the vehicle's direction of movement. That track is able to move around the board by means of cylinders arranged in the form of a belt extending around the board between the board and the track. The device can be used to facilitate movement of off-road vehicles across obstacles. It can also be used to provide snow-free sledges and skis. It is also envisaged that the device may be incorporated into a trolley, which can be used on uneven surfaces.

14 Claims, 10 Drawing Sheets

U.S. PATENT DOCUMENTS

| | | | |
|---|---|---|---|
| 2,173,793 A | | 9/1939 | Doblhoff |
| 2,236,817 A | * | 4/1941 | Clement .......................... 15/80 |
| 2,618,349 A | | 11/1952 | Ludema |
| 2,625,229 A | * | 1/1953 | Van Voorhees ............... 180/181 |
| 2,719,062 A | | 9/1955 | Arps |
| 2,985,278 A | * | 5/1961 | McKnight et al. ............ 198/809 |
| 3,469,553 A | * | 9/1969 | Gagne ........................ 440/12.64 |
| 4,069,883 A | | 1/1978 | Cousineau |
| 4,204,583 A | * | 5/1980 | Toyoura et al. ............. 180/9.28 |
| 4,313,516 A | | 2/1982 | Terry |
| 4,391,343 A | | 7/1983 | Deare |
| 4,433,634 A | * | 2/1984 | Coast ........................ 440/12.64 |
| 4,440,408 A | * | 4/1984 | Velman ........................ 280/7.12 |
| 4,598,783 A | * | 7/1986 | Tippen ........................ 180/9.32 |
| 4,613,006 A | | 9/1986 | Moss et al. |
| 4,655,307 A | | 4/1987 | Lamoureux |
| 4,821,824 A | * | 4/1989 | Gilbert ........................ 180/9.28 |
| 4,865,141 A | | 9/1989 | Gey |
| 4,984,648 A | | 1/1991 | Strzok |
| 6,155,362 A | | 12/2000 | Owens |
| 2004/0011574 A1 | | 1/2004 | Borgwarth et al. |

FOREIGN PATENT DOCUMENTS

| | | |
|---|---|---|
| DE | 3 638 150 A1 | 6/1987 |
| DE | 297 17 129 U1 | 12/1997 |
| EP | 0 414 325 A1 | 2/1991 |
| FR | 2 677 600 A3 | 12/1992 |
| GB | 621 584 | 4/1949 |
| GB | 817 828 | 8/1959 |
| GB | 1 383 019 | 2/1975 |

OTHER PUBLICATIONS

Speedy Jack—Producer of Grasski http://www.grasski.com/application/home.php?lang=en.

International Preliminary Report on Patentability (Chapter I) for International Application No. PCT/GB2005/002203 (Published as WO 2005/118378); issued by the European Patent Office in its capacity as PCT International Search Authority (ISA/EP) on Dec. 12, 2006.

* cited by examiner

DEVICE FOR FACILITATING THE MOVEMENT OF A VEHICLE

FIELD OF THE INVENTION

The present invention relates to a device for facilitating the movement of a vehicle across ground, and which is particularly useful for facilitating movement across uneven surfaces and for the carrying of awkward loads.

BACKGROUND OF THE INVENTION

Wheeled transport is used in a wide variety of functions and pastimes. However, in some circumstances wheels do not work as well as desired. Wheeled transport is not an effective way of moving loads on uneven, loose or soft ground. In particular, problems can arise where movement across an uneven surface is required.

Off-road vehicles are designed for driving on ground that is uneven and which can be muddy. They include several features that make them suitable for this, such as four wheel drive. However, off-road vehicles are still liable to become stuck if they hit an obstacle, such as a rock, a tree trunk or a rut in the terrain.

Endless tracks arranged around fixed wheels are a well-known way of facilitating off-road movement of, for example, military vehicles. However, these do not provide as much movement as may be desirable for certain types of off-road use of a vehicle.

GB 621,584 discloses a load carrying vehicle in which movement is facilitated by endless tracks arranged around a series of sprocket wheels. The load carrying vehicle can be used in a position where the endless tracks are in contact with the ground. In such a position, a hand wheel can be used to rotate the sprocket wheels, thereby moving the vehicle on the endless tracks. This type of vehicle requires the user manually to rotate sprockets engaging the caterpillar track and thus to move the caterpillar track in order to enable the vehicle to move.

U.S. Pat. No. 2,173,793 discloses an endless track vehicle with auxiliary wheels. In this vehicle, the wheels are raised when it is operated with the endless tracks. When not in use (i.e. when travelling on wheels), the endless tracks are raised to increase clearance from the ground.

Thus, in this vehicle, it is not intended that the endless track should come into contact with the ground when the wheels are in use.

EP 0 414 325 discloses a vehicle suitable for on- and off-road use. The vehicle is provided with a frame that supports guiding wheels around which an endless track is arranged. The frame can be lowered when the vehicle is used off-road in order that the track may be driven around the guiding wheels in order to provide traction with the ground. Again, when the frame (and hence the track) is in its raised position, it is not intended that the track should come into contact with the ground. Moreover, were it to come into contact with the ground in its raised position, it would not provide adequate protection to the underside of the vehicle.

DE 36 38 150 describes a drilling trailer with retractable tracks for off road operation. The trailer includes two track units, each comprising a track that can be lowered to contact the ground. The track units are intended to extend hydraulically into an operational position when required for off-road use. Again, these tracks are not intended to contact the ground when in their raised position.

DE 27 53 706 describes an all-terrain vehicle having a retractable track drive. Again, the retractable tracks are intended to be lowered when the vehicle is on an appropriate terrain.

FR 2 677 600 discloses a child's pushchair having a track that lowers to the same level as the wheels when an obstacle is encountered. The track does not facilitate movement when in its raised position, and does not provide any protection to the underside of the pushchair.

The underside of a motor vehicle is generally protected by a sheet of steel. This only offers partial protection to the vehicle since impacts are unable to glance off. Such impacts impede movement (even stopping a vehicle moving altogether) and are liable to damage a vehicle. There is therefore a need for a way of facilitating movement of off-road vehicles across such obstacles, and for providing improved protection to the vehicle.

Wheeled trolleys are often used to enable heavy loads to be moved. However, these can be difficult to use if the surface is anything other than smooth and firm. An improved trolley having the ability to traverse uneven surfaces is needed.

Skiing and sledging are popular winter pastimes, but they require a certain amount of snow fall. It is often not possible to continue with these pastimes in countries having little snow fall, unless specially constructed dry ski slopes are visited. Moreover, it is not possible to pursue these activities in the summer in most places. A means of skiing or sledging on a snow-free surface is desirable.

SUMMARY OF THE INVENTION

According to a first aspect of the present invention there is provided a device for facilitating movement of a vehicle across ground, including a surface for contacting the ground, the surface being mounted on a body so as to be movable in at least the reverse direction relative to the vehicle's direction of movement, and means for attaching the body to the underside of a vehicle, wherein friction-reducing components are provided between the surface and the body, wherein the friction-reducing components are mounted on a plurality of spindles extending transversely across the body, and wherein more than one friction-reducing component is mounted on each spindle.

This arrangement facilitates movement of a vehicle across ground since the surface is able to contact the ground and remain stationary relative to the ground. The body, and the vehicle move relative to the surface and hence are able to continue to move across the ground even though the surface is stationary relative to the ground. The friction-reducing components provided between the surface and the body enable the surface to move in relation to the body with less resistance. The spindles provide support to the friction reducing components, and where the friction-reducing components are rotatable, the spindles allow then to rotate freely. The presence of more than one friction-reducing component on each spindle provides a decrease in resistance between the surface and the body, and also help to support the large impact which the device would be subjected in use.

Moreover, the present device, in addition to enhancing the terrain capacity of a vehicle, offers greater protection to the underside of a vehicle. It is able to provide these advantages without substantially adding to the thickness of conventional protection such as steel sheets.

In a preferred embodiment, the surface is movable independently of movement of the vehicle. This enables the device to facilitate movement of a vehicle without the need to be connected to a drive mechanism.

Preferably the surface is a belt looped around the body so as to be movable around the body. The surface thus is able to move between the body and the ground and between the body and the underside of the vehicle. This is assisted by the means for attaching the device to the vehicle holding the body away from the underside of the vehicle. This feature provides a surface capable of continuous movement relative to the vehicle.

The surface preferably has a width substantially equal to the width of the body. This provides the best support to the surface.

The means for attaching the device to a vehicle preferably comprises at least one bracket. The brackets may be L-shaped and may be fixed along opposite sides of the body.

The surface is preferably formed by a plurality of panels. The panels are preferably hinged with respect to one another along an axis transverse to the axis of movement of the surface. In the preferred embodiment, the panels are able to fold with respect to one another in one direction only.

The panels of the surface preferably have a width substantially equal to the width of at least twice the diameter of each friction-reducing component. This arrangement provides the best support to the panels of the surface.

The friction-reducing components may be configured to reduce the area of contact between the surfaces that move relative to one another. By the surfaces that move relative to one another it is meant either the surface and the friction-reducing components or the friction-reducing components and the body, depending on whether the friction reducing components move with the surface, with the body, or with a combination of both. This allows the surface to move with respect to the body more easily, since instead of the whole of the surface being in contact with the body the surface is in direct contact only with the friction-reducing components.

The spindles may be fixed to the body. This allows the surface to move across the friction-reducing components.

In the preferred embodiment, the friction-reducing components are arranged to be able to move around the exterior of the body, between the body and the surface. The surface is in contact with the friction-reducing components and a force applied to the surface causes movement of the friction-reducing components about the exterior of the body.

The friction-reducing components could be arranged in a movable belt, said belt looping around the body. This arrangement retains the friction-reducing components in place with respect to their direction of movement.

In the preferred embodiment, the belt includes a plurality of friction-reducing components, each separated by a chain. The chain preferably comprises links, said links attaching each spindle to adjacent spindles. The chains ensure that the friction-reducing components remain in place and prevent lateral movement of the friction-reducing components.

In the preferred embodiment the friction-reducing components on adjacent spindles are in a staggered arrangement with respect to one another. This enables adjacent spindles to be closer together and therefore provides the best support for the surface.

Preferably the friction-reducing components are arranged such that they have a fixed relationship to one another. This ensures that they travel in the same direction at the same speed, thereby increasing the efficiency of the movement between the surface and the body.

The friction-reducing components could comprise a plurality of rotatable elements. These not only reduce the contact area of the surface, but also aid movement of the surface with respect to the body through rotation. Where the rotatable elements are also movable, this enables the surface to move relative to the body to a greater extent than the friction-reducing components due to their rolling between the surface and the body.

In the preferred embodiment, the friction-reducing components are cylinders. These allow the most efficient arrangement of friction-reducing components thereby providing the greatest support to the surface, whilst still providing the necessary movement between said surface and the body.

The body may be a substantially rectangular board, with opposite ends of the board being rounded off. This allows the friction-reducing components to roll smoothly and continuously about the exterior of the body.

The surface is preferably fabricated from steel. It preferably has a cover extending around its ground-contacting surface. Said cover is preferably plastic or rubber. The interior of the surface is preferably smooth.

Preferably, the body has at least one guide channel and the surface has hooks for co-operating therewith. The hooks may have rollers and/or there may be space between the hooks and the edges of the guide channel. These arrangements help to reduce friction between the hooks and the guide channel, thereby allowing the surface to move freely with respect to the body.

In the preferred embodiment, the surface includes at least one brush. Preferably these extend substantially at a right-angle from the end of each panel of the surface. Such brushes prevent dirt or debris entering the device.

In the preferred embodiment, the body is fabricated from steel. Preferably the friction-reducing components are fabricated from plastic. This combination has low friction and eliminates the need for lubrication.

According to a second aspect of the present invention, there is provided a vehicle including one or more devices as defined above.

The vehicle may be a motor vehicle, a sledge, a ski or a load-carrying device, such as a trolley.

According to the third aspect of the present invention, there is provided a device for facilitating movement of a wheeled vehicle across ground, including a surface for contacting the ground, the surface being mounted on a body, and means for attaching the body to the underside of a vehicle, wherein the surface is movable independently of movement of the vehicle in at least the reverse direction relative to the vehicle's direction of movement, wherein the surface is arranged to be attached to a vehicle only at a raised position relative to the ground-contacting portion of a vehicle's wheels and wherein in this raised position the surface is unable to contact ground that is at the same level as the ground-contacting portion of vehicle's wheels.

This arrangement facilitates movement of the vehicle across ground since the surface is able to contact the ground and remain stationary relative to the ground. The body, and the vehicle move relative to the surface and hence are able to continue to move across the ground even though the surface is stationary relative to the ground. The device is held in a position relative to the underside of a vehicle such that the surface does not contact ground that is at the same level as the ground-contacting portion of the vehicle's wheels. Moreover, the surface cannot be lowered to the same level as the lowest (ground-contacting) surface of a vehicle's wheels. However, on uneven ground, the movable surface comes into contact with the ground before any part of the underside of the vehicle is able to come into contact with the ground. The device thus enables the vehicle to pass over such uneven ground (or other obstacles) without difficulty.

According to a fourth aspect of the present invention there is provided a device for facilitating movement of an off-road vehicle across uneven ground, including a surface for contacting the ground, the surface being mounted on a body, and means for attaching the body to the underside of a vehicle, wherein the surface is movable independently of movement of the vehicle in at least the reverse direction relative to the vehicle's direction of movement, wherein friction-reducing components are provided between the surface and the body, the friction-reducing components being arranged to be able to move around the exterior of the body between the body and the surface.

This arrangement facilitates movement of the vehicle across ground as the surface is able to contact the ground and remain stationary relative to the ground. The body, and the vehicle move relative to the surface hence are able to continue to move across the ground even though the surface is stationary relative to the ground. The friction-reducing components allow the surface to move in relation to the body with less resistance. The ability of the friction-reducing components to move around the exterior of the body between the body and the surface means that a force applied to the surface causes movement of the friction-reducing components about the exterior of the body, and thus facilitates and increases movement of the surface relative to the body. This results in increased movement of a vehicle across uneven ground.

According to a fifth aspect of the present invention there is provided a device for facilitating movement of a vehicle across ground, including a surface for contacting the ground, the surface being mounted on a body, and means for attaching the body to the underside of a vehicle, wherein the surface is movable independently of movement of the vehicle in at least the reverse direction relative to the vehicle's direction of movement.

This arrangement facilitates movement of a vehicle across ground since the surface is able to contact the ground and remain stationary relative to the ground. The body, and the vehicle move relative to the surface and hence are able to continue to move across the ground even though the surface is stationary relative to the ground. The means for attaching the device to the underside of a vehicle preferably holds the body away from the vehicle so as to allow the surface to contact the ground before the underside of the vehicle. They also serve to hold the body in stationary relationship with respect to the vehicle.

BRIEF DESCRIPTION OF THE DRAWINGS

Preferred embodiments of the present invention are described below, by way of example only and with reference to the accompanying drawings, in which.

DETAILED DESCRIPTION OF PREFERRED VERSIONS OF THE INVENTION

Figure 1:
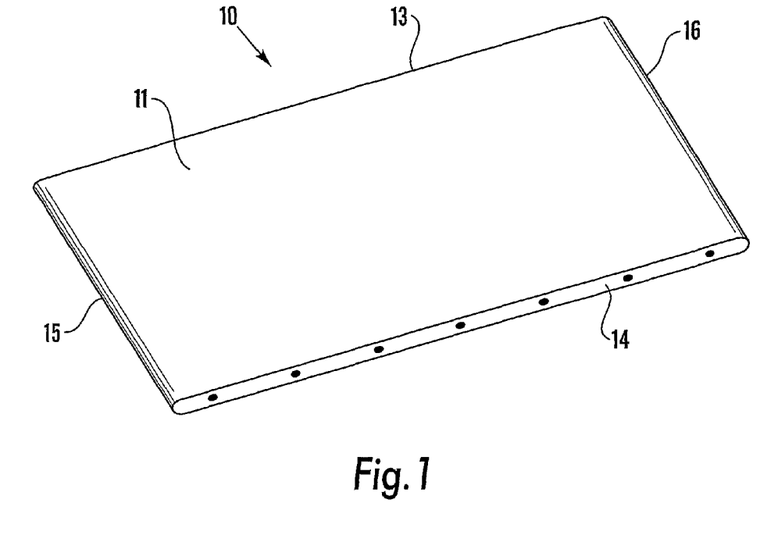
FIG. 1 is a perspective view of a board used in a device for facilitating the movement of a vehicle.

FIG. 1 shows the board-like body 10 of a device for facilitating the movement of a vehicle in a preferred embodiment (guide channel (see below) omitted for clarity). It is rectangular in shape, having a length of 40 cm, a width of 23.5 cm and a thickness of 1.2 cm and being made from steel. Board 10 has two flat surfaces (one of which 11 can be seen in FIG. 1), two long sides 13, 14 and two short sides 15, 16. The two short sides 15, 16 of board 10 are rounded off so that cylinders 31 (see below) are able to roll smoothly and continuously from one surface 11 of board 10 to the other.

Figure 2:
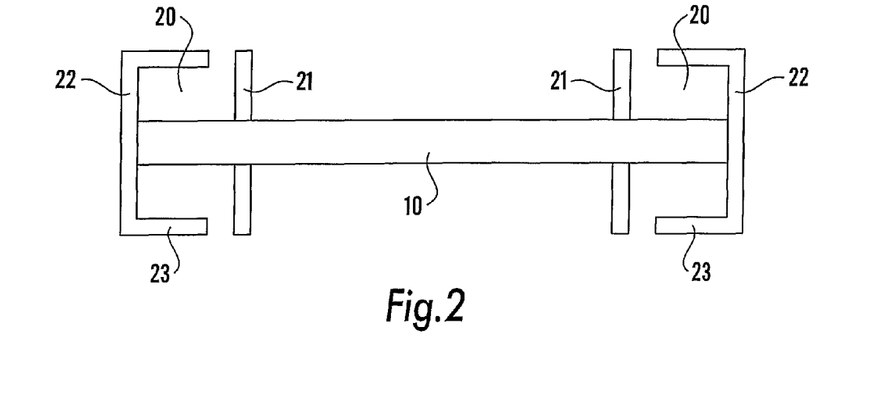
FIG. 2 is a cross section of a board used in the device.

Turning to FIG. 2, board 10 also includes a guide channel 20 extending along each long edge of each surface 11 such that guide channel 20 loops around board 10 continuously from one surface 11 of the board to the other. FIG. 2 shows board 10 in cross-section so that the structure of guide channel 20 can be seen. The guide channel comprises an upright wall 21 and a hooked wall 22. Hooked wall 22 covers the long sides 13, 14 and has an L-shaped overhang 23.

Figure 3:
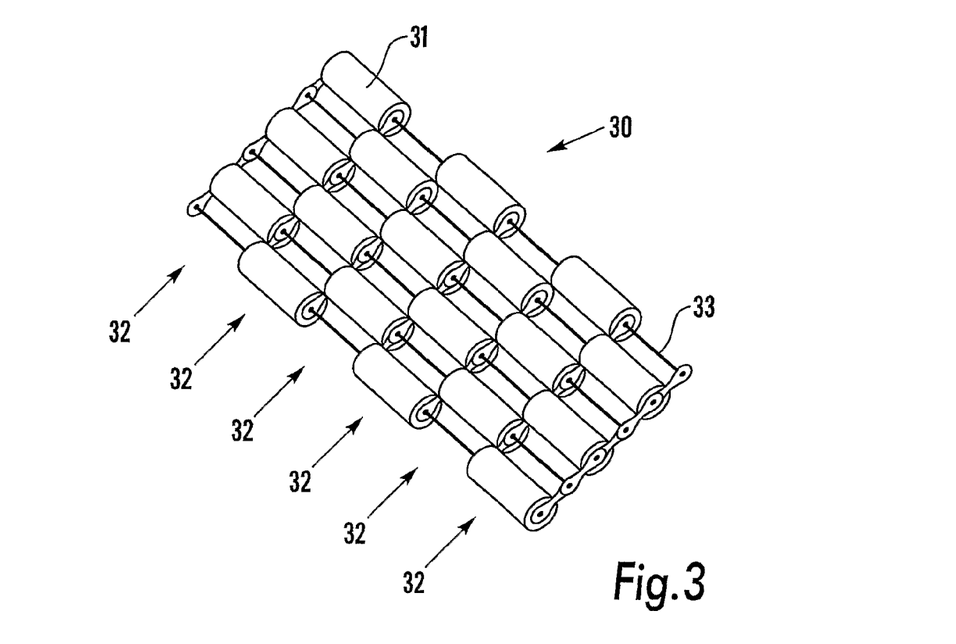
FIG. 3 is a perspective view of a portion of a belt of cylinders used in the device.

With reference to FIG. 3, in this embodiment friction-reducing components are provided in the form of robust plastic cylinders 31, arranged in the form of a belt 30 that extends longitudinally around board 10. Belt 30 is positioned between upright walls 21 to constrain it transversely on board 10. FIG. 3 shows a portion of belt 30. The cylinders 31 are arranged in six rows 32, the six rows together forming belt 30. Each row 32 thus loops around the exterior of board 10, from one surface 11 to the other. Three cylinders 31 are mounted on each of several spindles 33 that extend across the width of belt 30. The cylinders 31 on adjacent spindles 33 have a staggered arrangement with respect to one another.

Figure 4:
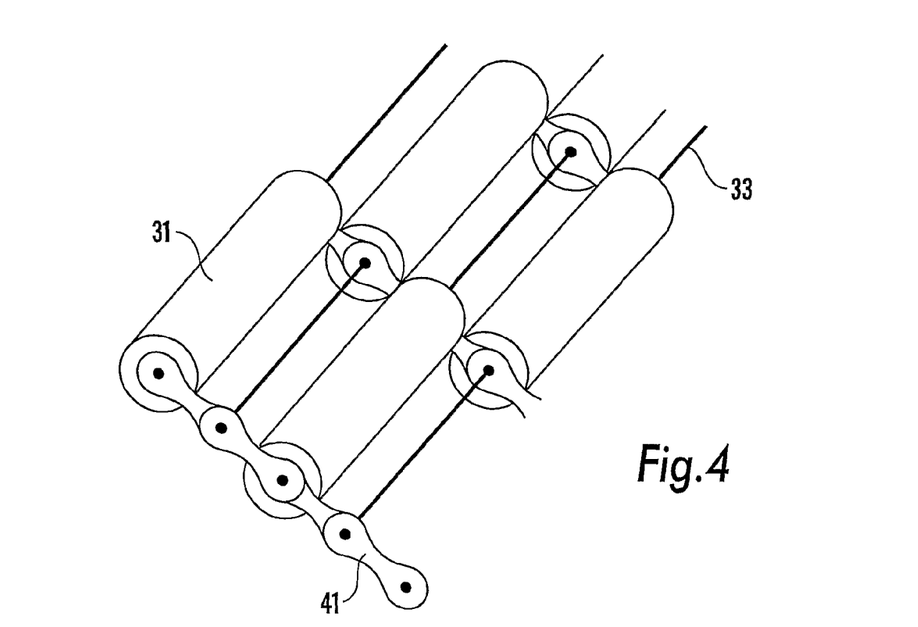
FIG. 4 is an enlarged portion of the belt of FIG. 3.

An enlarged portion of belt 30 is shown in FIG. 4. It can be seen that each spindle 33 is connected to adjacent spindles 33 by links 41 forming a chain. The links 41 are located at each end of the spindles 33, and also in between each row 32 of cylinders 31.

Figure 5:
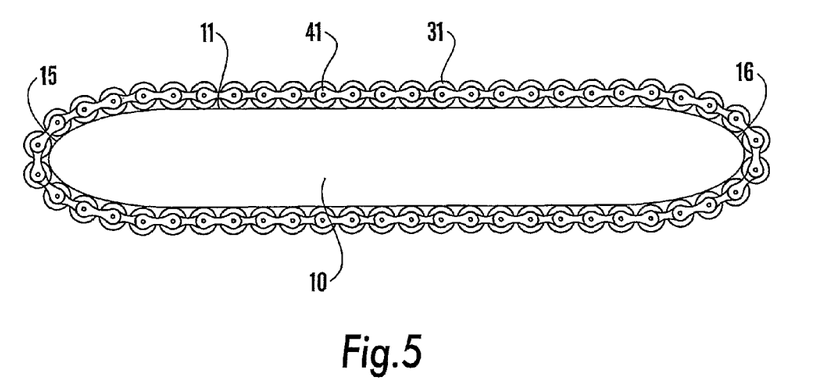
FIG. 5 is a side view showing how the belt is arranged around the board.

FIG. 5 shows a side view of the belt 30 of cylinders 31 arranged around board 10 (guide channel 20 omitted for clarity). The cylinders 31 enable belt 30 to move freely around board 10, so that each cylinder 31 is able to pass from one surface 11 of board 10 to the other around rounded ends 15, 16 in a smooth and continuous manner.

Figure 6:
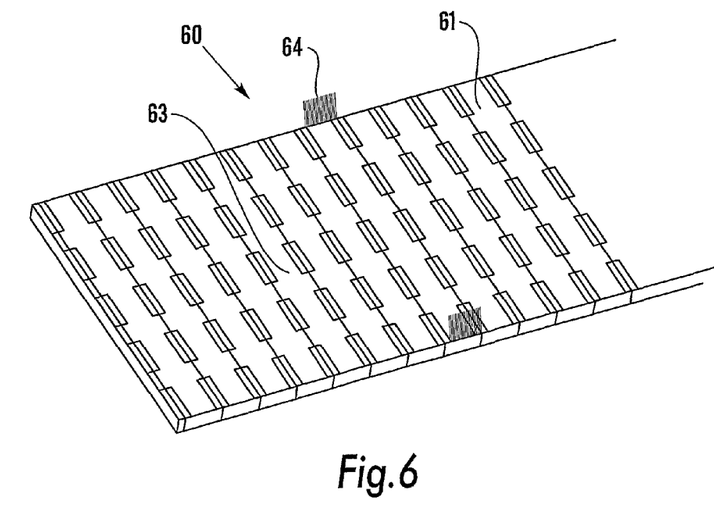
FIG. 6 is a perspective view showing a portion of a track used in the device.

FIG. 6 shows a portion of track 60. Track 60 includes a series of steel panels 61. Each panel 61 has a length that is approximately the same as the width of board 10. The width of each panel 61 is such that it extends across the cylinders 31 of two adjacent spindles 33.

Each panel 61 is attached to adjacent panels along one of its long edges 62. Track 60 has an inner surface 63 (shown in FIG. 6) and an outer surface (not seen in FIG. 6). Brushes 64 are provided at each end of each panel 61. These are shown on one of the panels only in FIG. 6, and extend perpendicularly, away from the outer surface of track 60.

Figure 7:
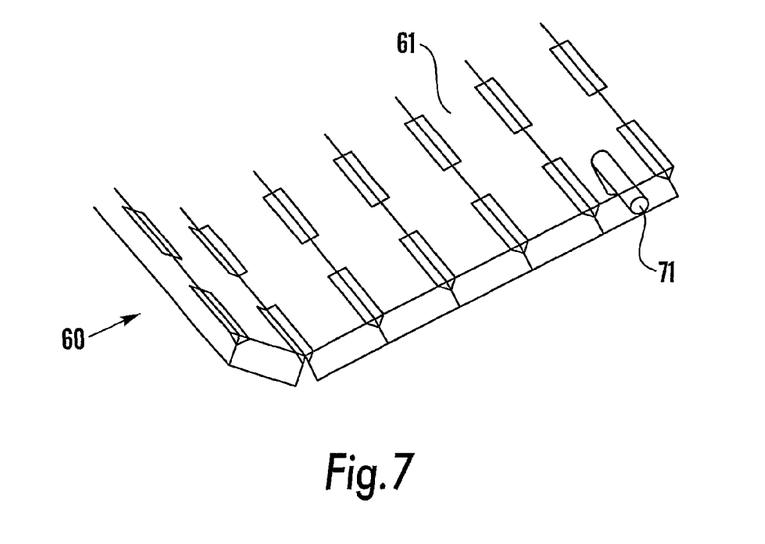
FIG. 7 is an enlarged portion of the track of FIG. 6.

FIG. 7 shows that panels 61 are hinged so that they are able to fold inwards with respect to one another so that track 60 is flexible in one direction but not in the other. The outer surface of track 60 is covered with tough rubber or plastic. The inner surface 63 of track 60 is smooth. Each panel 61 of track 60 includes two hooks 71 (of which one is shown in FIG. 7, a corresponding hook is also present at the other end of the panel). Each hook 71 is fixed to the inner surface of each panel 61 of track 60, but extends laterally from track 60.

Figure 8:
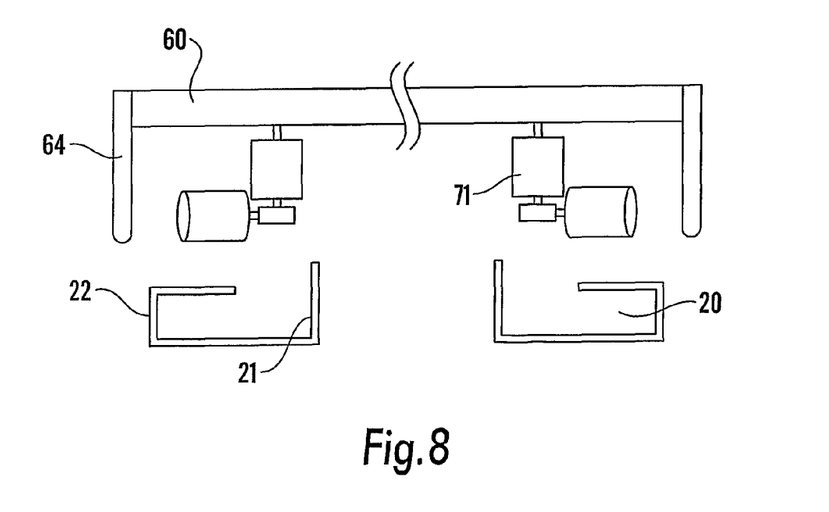
FIG. 8 is a cross-section of the track and guide channels.

FIG. 8 shows hooks 71 in more detail. Hooks 71 are L-shaped, and each includes a cylindrical roller on its downwardly extending part and also on its laterally extending arm.

Figure 9:
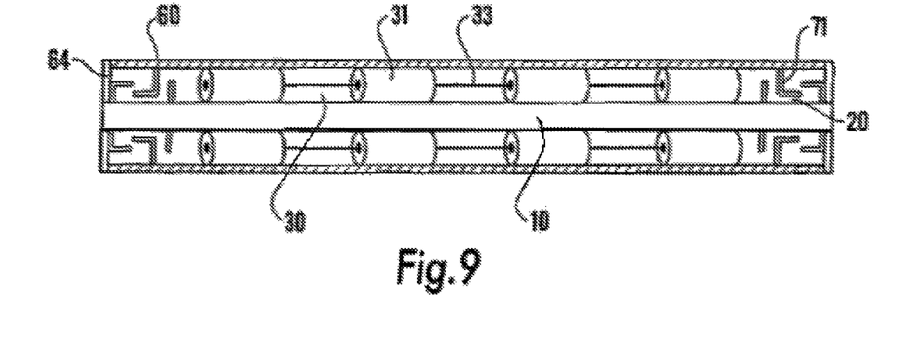
FIG. 9 is a cross-section through the device.

Track 60 is secured around board 10 in alignment with belt 30 of cylinders 31 by means of the hooks 71 and guide channel 20. FIGS. 8 and 9 illustrate how this is achieved. The dimensions of hooks 71 and guide channel 20 are such that there is some space around hooks 71 within guide channel 20. As can be seen in FIG. 9, track 60 serves to hold belt 30 of cylinders 31 against board 10 (i.e. it prevents belt 30 from hanging away from board 10 due to gravity), and between upright walls 21. When track 60 is in place, brushes 64 come into light contact with board 10.

Figure 10:
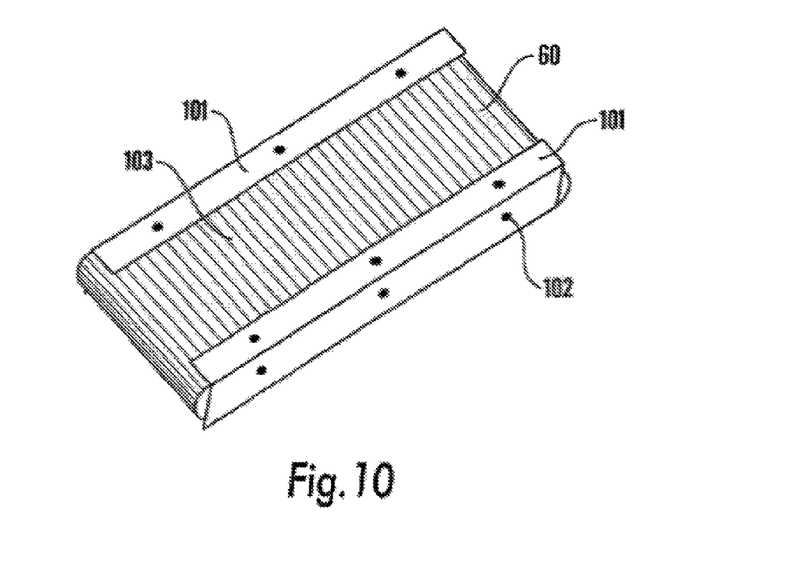
FIG. 10 is s perspective view of a fully assembled device.
Figure 11:
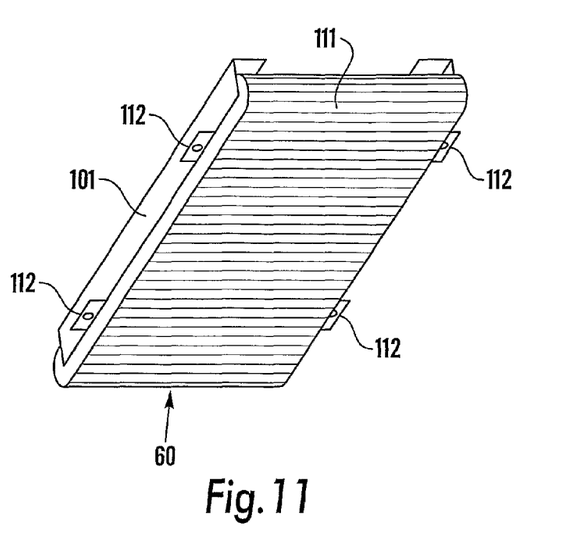
FIG. 11 is an end view of the device.

Board 10 is further provided with two L-shaped brackets 101 extending along its long sides 13, 14 (FIGS. 10 and 11). Bolts 102 are used to attach brackets 101 along the sides 13, 14 of board 10. The dimensions of brackets 101 are such that track 60 does not come into contact with them. Brackets 101 provide a means of fixing board 10 in a stationary manner to a vehicle via flanges 112. The only movable parts of the device are thus belt 30 of cylinders 31 and track 60. This results in the device having one side 103 that is immobile and that is attached to a vehicle 130, and an opposite side 111 that is able to move.

Figure 12:
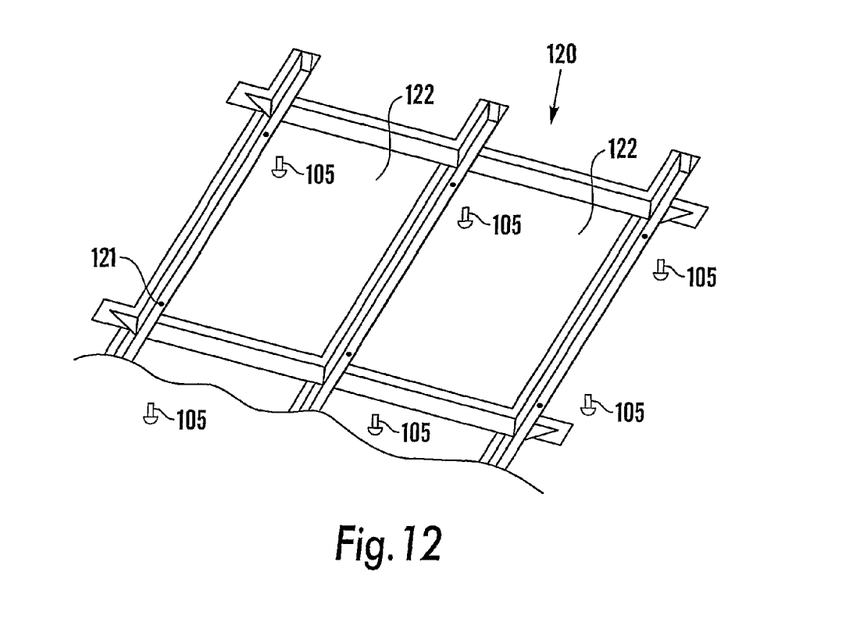
FIG. 12 is a perspective view of a portion of a frame.

The device 131 can be fitted to the underside of a vehicle 130 by means of a suitable frame 120. A portion of such a frame 120 is shown in FIG. 12. The depth of frame 120 should be less than the thickness of the device 131 to prevent its hindering the effect of the device 131. The device 131 is secured to frame 120 in spaces 122 by bolts 105, which extend through flanges 112 into apertures 121. The device is cushioned by rubber pads (not shown). Frame 120 is bolted to the chassis of vehicle 130 and is cushioned by rubber washers as shock absorbers (not shown).

Figure 13:
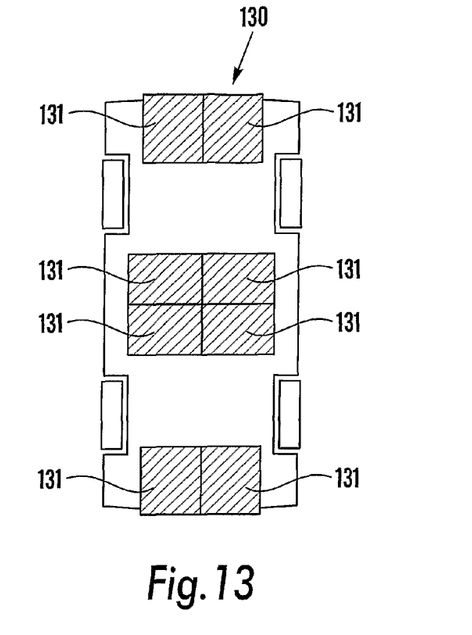
FIG. 13 is a schematic view of the underside of a vehicle including the device.
Figure 14:
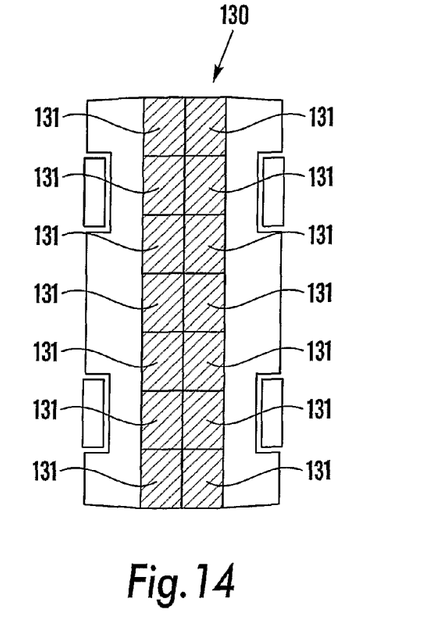
FIG. 14 is a schematic view of the underside of a vehicle including the device.
Figure 15:
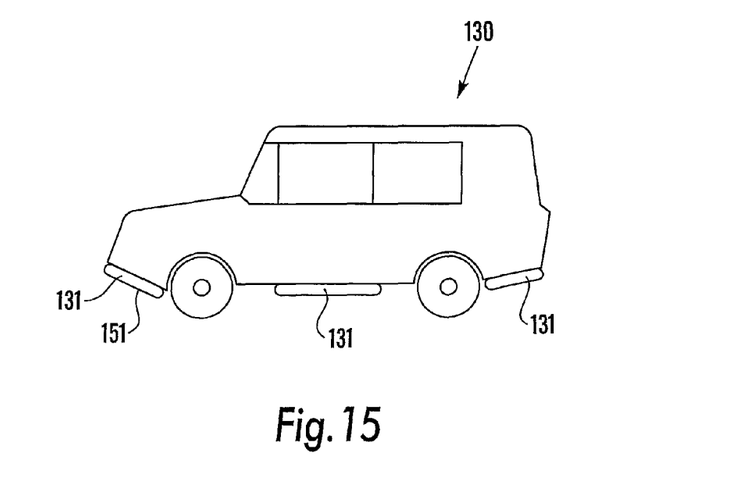
FIG. 15 is a side view of a vehicle including the device.

The devices 131 can be arranged in any suitable manner on the underside of vehicle 130. Two examples are shown in FIGS. 13 and 14. The number of devices 131, and the manner in which they are arranged will depend on the type of vehicle 130 and the use to which it is to be put. It is envisaged that for a typical off-road vehicle 130, devices 131 will be provided at least under an inclined surface 151 at the front of the vehicle 130 (see FIG. 15).

The way in which the device for facilitating the movement of a vehicle works will now be described.

Figure 16:
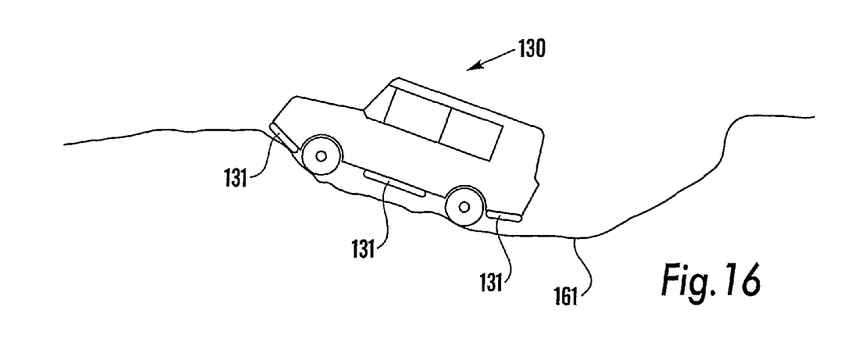
FIG. 16 is a side view of a vehicle including the device.

If an off-road vehicle 130 hits an obstacle, the devices 131 described above can help the vehicle 130 to pass such an obstacle. For example, as shown in FIG. 16, a vehicle 130 has entered a dip 161 on uneven ground, and the underside of inclined surface 151 at the front of the vehicle 130 has hit the edge of dip 161 in trying to drive out. Without the device 131 the vehicle would be likely to get stuck. However, if provided with a device 131, the momentum of vehicle 130 due to its previous movement allows it to get over the edge of dip 161.

Figure 17:
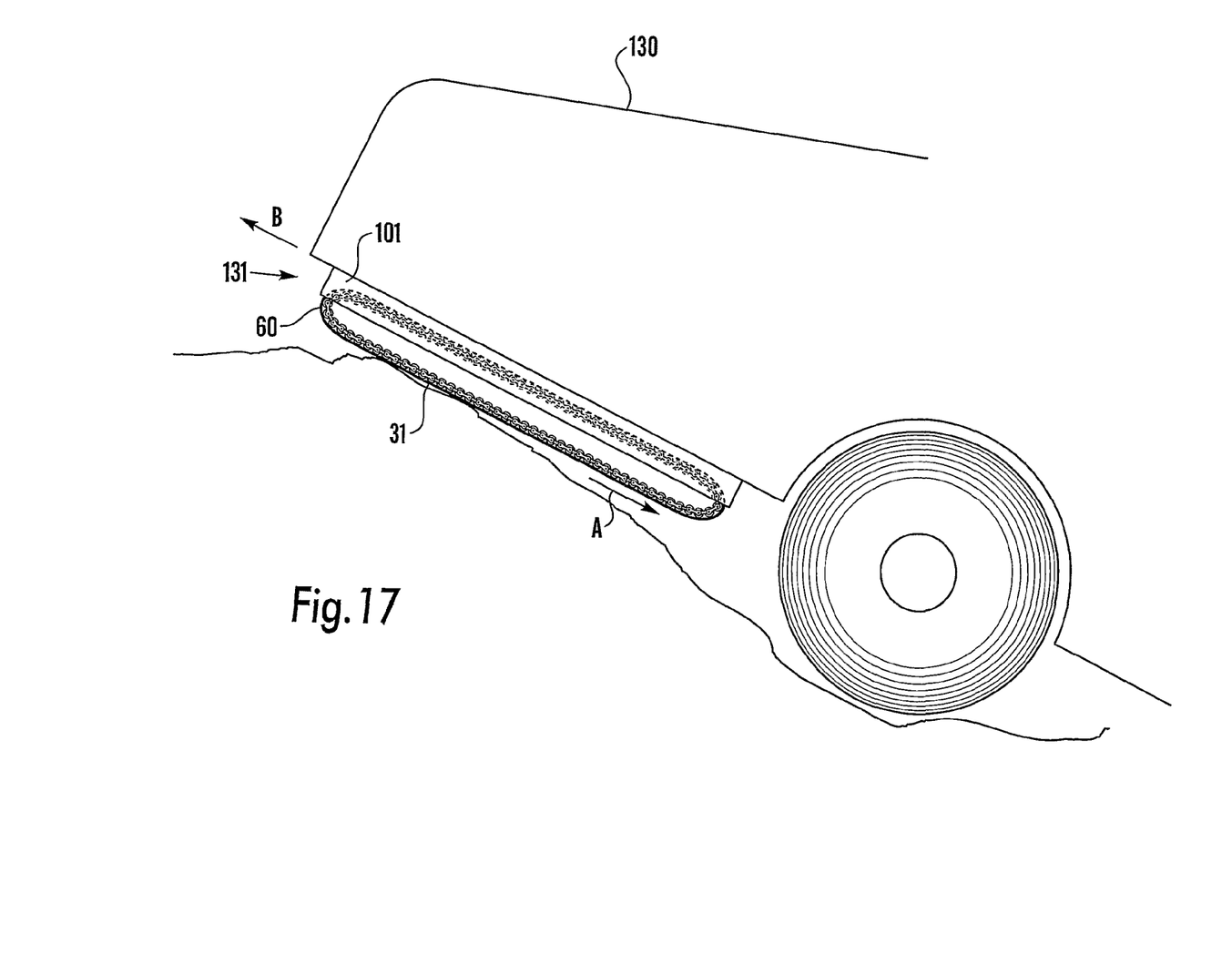
FIG. 17 is an enlargement of part of FIG. 16.

This is shown in more detail in FIG. 17. As the underside of the inclined surface 151 at the front of vehicle 130 hits the obstacle, a glancing impact occurs between the obstacle and track 60. Board 10 is in a stationary relationship with vehicle 130 (due to fixing by brackets 101) and thus has the momentum of vehicle 130. The momentum of vehicle 130 as it hits the obstacle enables track 60 to move relative to board 10 due to the rotation in an anticlockwise direction of cylinders 31 across board 10. (In FIG. 17, Arrow A indicates movement of track 60, and Arrow B indicates movement of vehicle 130 over the obstacle.)

Vehicle 130 is therefore able to overcome an obstacle instead of becoming stuck. In effect it is only movement of track 60 relative to the obstacle that is impeded due to friction between the obstacle and track 60. However, movement of board 10 (and hence vehicle 130) relative to stationary track 60 enables vehicle 130 to overcome the obstacle.

Even if the obstacle has a height greater than that of the wheels of vehicle 130, the front wheels could rise and vehicle 130 could still pass over the obstacle driven by the rear wheels.

Once a device 131 at the frontmost part of a vehicle 130 has enabled the vehicle 130 to start to pass over an obstacle, the provision of a plurality of devices 131 on the underside of a vehicle 131 enables the vehicle 130 to keep moving over the obstacle until it has been fully overcome.

There are various advantages of the above-described arrangement.

The device 131 facilitates movement of a vehicle no matter what load is being carried. The effect can be achieved even on an inclined surface. The momentum of vehicle 130 allows it to keep moving forwards when an object is hit. It is able to keep moving for 10 m, although only a distance of around 1.5 m would be required to overcome most obstacles.

The device 131 provides protection to the underside of vehicle 130 as well as being a means for traversing obstacles. It significantly increases a vehicle's ability to cross uneven terrain.

The staggered arrangement of cylinders 31 provides stable support for track 60 without affecting the movement of track 60 relative to vehicle 130. The above-described arrangement prevents track 60 from being pushed in towards board 10 or from flexing in accordance with obstacles that it may come into contact with when a force is applied to it. This arrangement of cylinders 31 also permits track 60 to move very easily across body 10, and also transmits to track 60 the strength and rigidity of body 10.

The chains between each row 32 of cylinders 31 provide lateral stability to spindles 33 and belt 30. They keep spindles 33 at right angles to the direction movement of belt 30 and prevent lateral movement of cylinders 31 so that they roll in the longitudinal direction only thereby increasing efficiency.

The steel and plastic combination for board 10 and cylinders 31 is a low friction arrangement and eliminates the need to lubricate the mechanism.

Covering of track 60 by a rubber or plastic coating provides protection, for example, from impact, scratches, dust etc.

The track does not hang down from the device, and does not flex in accordance with obstacles that it may come into contact with.

Panels 61 are close-fitting in order to prevent entry of debris into the mechanism.

Brushes 64 help prevent ingress of dirt and dust into the mechanism. If cylinders 31 are kept clean there will be less friction between cylinders 31 and board 10, and the device 131 will have an improved performance.

The space around hooks 71 in guide channel 20 also serves to reduce friction. As track 60 is pushed towards belt 30 of cylinders 31 due to the force of an obstacle, hooks 71 are pushed into free space and are able to move along guide channel 20 unimpeded.

The arrangement of devices 131 at the underside of vehicle 130 depends on the requirements of the manufacturer and the use to which vehicle 130 is likely to be put. The devices 131 could be fitted to selected parts or to all of the base of a vehicle (FIGS. 13 and 14), according to the wishes of the vehicle manufacturer or the designated purpose of the vehicle.

The provision of several separate devices 131 in frame 120 on the underside of vehicle 130 spreads the overall effort across the entire system. In practice, not all parts of the underside of vehicle 130 would come into contact with obstacles, such as, for example, rocks, trees or uneven parts of cross-country terrain. This means that only some of the devices 131 would be necessary even in a worst-case scenario. Since any obstacle is likely only to hit any one individual device 131 at a time, or to hit individual devices 131 with differing amounts of force, wear and tear on the system can be uneven. Therefore, movement is effected in the areas required, and wear is minimised. Having several separate devices 131 allows them to be replaced individually as and when required.

Use of frame 120 to attach the devices 131 to vehicle 130 maximises the strength of the system whilst minimising weight. Frame 120 allows the devices 131 to be fitted as close as possible to one another, ensuring the entire underside of vehicle 130 has devices positioned where they will be most needed.

Rubber pads between the device 131 and frame 120 lessen the likelihood of deformation of the frame. Rubber absorbers between frame 120 and vehicle 130 prevents the force of any impact being transferred to frame 120 and vehicle 130 and thereby reducing movement of track 60 across board 10.

There are various modifications that can be made to the above-described embodiment.

The device 131 may be any suitable shape. For example it may be flat, rounded or curved.

The rotatable elements 31 need not be cylinders: they may be any suitable shape, for example, spheres. The rotatable elements 31 could be made from metal instead of plastic, although better movement between the track 60 and the body 10 is obtained where they are plastic.

Track 60 could be flexible outwardly as well as inwardly. In practice, once arranged around board 10 only inward flexibility is material (and is advantageous should the width of panel 61 be less than the distance between adjacent spindles). However, if body 10 is not flat then track 60 should be flexible in both directions.

Track 60 need not have a plastic or rubber covering. Track 60 could be made completely from a hard-wearing plastic or robust rubber. However, a steel inner surface 63 of track 60 in contact with cylinders 31 provides the best movement. The outer surface of track 60 need not be smooth and could be ridged.

Hooks 71 for co-operating with guide channel 20 and holding track 60 need not include rollers. However, if there is no or little free space between hooks 71 and the edges of guide channel 20, rollers are preferred since they reduce friction if hooks 71 come into contact with the edges of guide channel 20 under the force of an impact.

Upright wall 21 of guide channel 20 could be at the outer edge of board 10 with hooked wall 22 positioned towards the centre of surface 11 of board 10. In this arrangement, hooks 71 would extend laterally inwards from the outer edge of each track panel 61.

Figure 18:
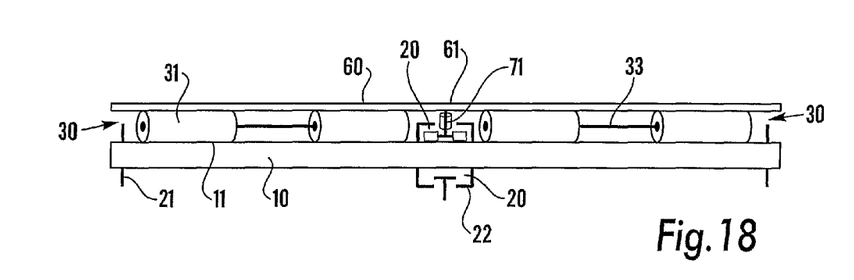
FIG. 18 is a cross-section through a modified device for facilitating the movement of a vehicle.

FIG. 18 shows a further alternative arrangement for guide channel 20 (belt 30 of cylinders 31 shown on upper surface 11 of board 10 only for clarity). In this arrangement upright walls 21 still extend around board 10 at its long edges, but hooked walls 22 are positioned along the centre line of board 10 forming guide channel 20. A T-shaped roller hook 71 having one downwardly extending roller and two laterally extending rollers is fixed to the centre of each track panel 61. Roller hook 71 co-operates with guide channel 20. In this arrangement, two belts 30 of cylinders 31 loop around board 10 in the spaces provided between guide channel 20 and each upright wall 21.

Figure 19:
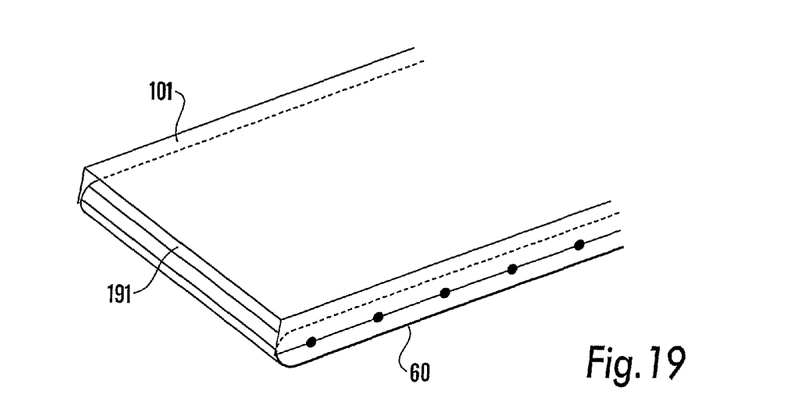
FIG. 19 is a perspective view of a modified device for facilitating the movement of a vehicle.

If the device 131 is intended to be attached to a surface that is not already flat, instead of individual brackets 101 being provided, a single bracket extending from one side of board 10 to the other could be provided (FIG. 19). Such a bracket forms a channel 191 through which belt 30 is able to move. Brackets 101 need not extend along the entire length of board 10.

The overall size of the device 131 can be varied depending on requirements. Typically it has a width of 20-30 cm, a length of 40-50 cm and a thickness of 2-5 cm (preferably 3 cm). Board 10 can be of any suitable thickness depending on the requirements; it could be as thin as 5 mm and would be strong enough to function for most off-road vehicle's needs.

The exact size and useful life of the device 131 will depend to some extent on the material used to make the components. Plastic and metal is the best combination because there is less friction between the components.

The devices 131 could be secured to frame 120 by any other suitable means such as a clamp.

In certain cases, the device 131 could be independently motorised. Two axes could be fitted, one to each end of board 10. Each axis would have sprockets at both ends. To one of the sprocket-wheeled axes would be fitted a drive. Track 60 would need to be modified so that the sprockets could drive it around board 10. This type of device 131 could be suspended under certain types of military vehicle or special-purpose cars.

Use of the definitions "long" and "short" with respect to the dimensions of the device 131 described above is arbitrary and is with reference to specific described embodiment. A device 131 could have belt 30 of cylinders 31 and track 60 extending from one surface 11 to the other around the longer sides of board 10.

The various described modifications may be interchanged as appropriate.

Figure 20:
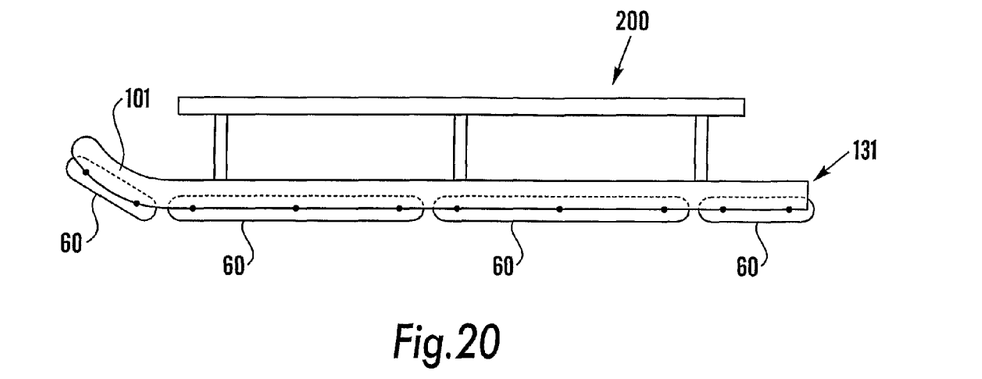
FIG. 20 is a side view of a sledge including the device.

In a second embodiment of the present invention, instead of being fixed to the underside of an off road motor vehicle, a modified device 131 comprising several tracks 60 secured to a single bracket 101 forms the underside of a summer sledge (FIG. 20). This could be used as a summer sledge 200 and would be suitable for use on a number of different surfaces including, for example, grass, asphalt, gravel or sand, and would work even if the surface were uneven.

A single device 131 comprising several tracks 60 attached to the underside of the sledge 200 should be sufficient to provide the desired effects. However, it is possible to change the dimensions of the device 131 and alter the number and arrangement of the devices 131 on the underside of the sledge 201 as desired.

Figure 21:
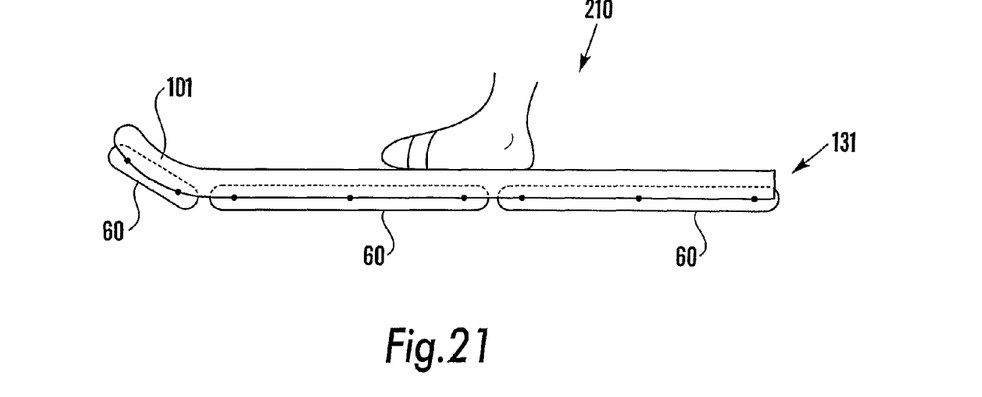
FIG. 21 is a side view of a ski including several of the devices.

In a third embodiment, a modified device 131, comprising several tracks 60 secured to a single bracket 101 forms a summer ski (FIG. 21). These are suitable for use on a number of different surfaces including, for example, grass, asphalt, gravel or sand, and would work even if the surface were uneven. In such a use, the device 131 would be approximately 6 cm wide and long enough to extend along the length of the ski 211.

Alternatively the ski 210 could include an appropriate number of several shorter devices 131.

The device 131 could be used to move any object that is difficult to move. It could be attached directly to an object to be moved, or it could be attached to a board, which could then be used as a trolley-type device 131 for moving heavy or awkward loads. The device 131 could be further modified, for example, by the addition of handles to make it easier to use. It could be used to move loads over area in which using wheeled transport would be difficult, for example, if the area were uneven or if there were a lack of space.

The skilled addressee will appreciate that many of the modifications described above in connection with the preferred embodiment are appropriate to the second, third and fourth described embodiments, and that various items of the proposed embodiments may be varied or exchanged without departing from the scope of the invention.

The invention claimed is:

1. A device for facilitating movement of a vehicle across the ground, including a surface for contacting the ground, the surface being mounted on a body, and a connector for attaching the body to an underside of the vehicle, wherein:
   a. the surface is movable independently of movement of the vehicle in at least a reverse direction relative to the vehicle's direction of movement,
   b. friction-reducing components are provided between the surface and the body,
   c. the friction-reducing components being arranged to be able to:
      (1) roll around an exterior of the body, between the body and the surface, and
      (2) roll with respect to the surface, such that the surface travels with respect to the friction-reducing components,
   d. the body has at least one guide channel,
   e. the surface has hooks for co-operating with the guide channel, each hook including a pair of rollers, at least one of the pair of rollers having a rotational axis extending from the ground-contacting surface in an at least substantially perpendicular direction.

2. A device for facilitating movement of a vehicle across the ground, including a surface for contacting the ground, the surface being mounted on a body so as to be movable in at least a reverse direction relative to the vehicle's direction of movement and a connector for attaching the body to an underside of the vehicle, wherein:
   a. friction-reducing components are provided between the surface and the body,
   b. the friction-reducing components are mounted on a plurality of spindles extending transversely across the body,
   c. more than one friction-reducing component is mounted on each spindle,
   d. the body has at least one guide channel,
   e. the surface has hooks for co-operating therewith,
   f. wherein the hooks have rollers, the rollers including a first roller having a rotational axis extending at least substantially perpendicular to the surface.

3. The device of claim 1 wherein the surface is formed by a plurality of panels.

4. A device for facilitating movement of a vehicle across ground, including a surface for contacting ground, the surface being mounted on a body, and a connector for attaching the body to an underside of the vehicle, wherein:
   a. the surface is movable independently of movement of the vehicle in at least a reverse direction relative to the vehicle's direction of movement,
   b. the surface is formed by a plurality of panels,
   c. friction-reducing components are provided between the surface and the body,
   d. the friction-reducing components being arranged to be able to:
      (1) roll around an exterior of the body, between the body and the surface, and
      (2) roll with respect to the surface, such that the surface travels with respect to the friction-reducing components, and
   e. a brush extends substantially at a right-angle from the end of each panel of the surface towards the body.

5. The device of claim 1 wherein the friction-reducing components are arranged in a movable belt, the belt looping around the body.

6. The device of claim 1, wherein one of the rollers has a rotational axis oriented at least substantially perpendicular to the other of the rollers.

7. The device of claim 1 wherein there is space between the hooks and edges of the guide channel.

8. A device for facilitating movement of a vehicle across ground, including a surface for contacting ground, the surface being mounted on a body, and a connector for attaching the body to an underside of the vehicle, wherein:
   a. the surface is movable independently of movement of the vehicle in at least a reverse direction relative to the vehicle's direction of movement,
   b. the surface includes at least one brush extending inwardly towards the body,
   c. friction-reducing components are provided between the surface and the body,
   d. the friction-reducing components being arranged to be able to:
      (1) roll around an exterior of the body, between the body and the surface, and
      (2) roll with respect to the surface, such that the surface travels with respect to the friction-reducing components.

9. The device of claim 1 in combination with the vehicle to which the device is attached.

10. The device of claim 9 wherein the vehicle is selected from the group consisting of a motor vehicle, a load-carrying device, a sledge or a ski.

11. The device of claim 9 wherein:
    a. the vehicle is a motor vehicle, and
    b. the device lacks a driving mechanism for moving the ground-contacting surface.

12. The device of claim 1 wherein the device lacks a driving mechanism for moving the ground-contacting surface.

13. The device of claim 1 wherein the body comprises a board having rounded ends around which the surface is able to move.

14. The device of claim 2, wherein each hook further includes a second roller having a rotational axis extending at least substantially parallel to the ground-contacting surface.

* * * * *